United States Patent [19]

Tiemann

[11] 4,301,982

[45] Nov. 24, 1981

[54] AIRCRAFT BLADE CLAMP

[76] Inventor: James P. Tiemann, 17 Crescent Dr., Huntington, N.Y. 11729

[21] Appl. No.: 64,220

[22] Filed: Aug. 6, 1979

[51] Int. Cl.³ .................................. B64C 27/50
[52] U.S. Cl. ................................ 244/17.11; 244/49; 244/224; 416/143; 269/228; 248/316 B
[58] Field of Search ................ 244/17.11, 49, 224, 244/7; 416/142, 143; 269/239, 228; 410/9, 19, 22, 25, 79; 24/248 R, 248 B, 248 E; 248/316 B; 294/106, 114, 118

[56] References Cited

U.S. PATENT DOCUMENTS

| | | | |
|---|---|---|---|
| 1,431,928 | 10/1922 | Brown | 294/114 |
| 1,966,240 | 7/1934 | Erdahl | 294/118 |
| 2,088,519 | 7/1937 | Hershey | 294/106 |
| 3,013,517 | 12/1961 | Isham | 294/110 |
| 3,133,715 | 5/1964 | Grunfelder | 416/143 |
| 3,186,749 | 6/1965 | Dawes | 294/106 |
| 3,802,798 | 4/1974 | Hibyan | 416/143 |
| 3,971,532 | 7/1976 | Fountain | 244/224 |

*Primary Examiner*—Galen L. Barefoot
*Attorney, Agent, or Firm*—Philip Rodman

[57] ABSTRACT

A clamping device for helicopter rotor blades or the like comprising clamping means for clampingly engaging only the leading end portion of the rotor blade while maintaining the trailing end portion thereof out of contact with said device.

29 Claims, 3 Drawing Figures

AIRCRAFT BLADE CLAMP

SUMMARY OF THE INVENTION

The invention relates to means in the nature of a clamp for releasably securing aircraft blades for example helicopter rotor blades in an inoperative position prior or subsequent to the use thereof in flight or otherwise.

For example, in the Armed Forces Flight Operations helicopters have an important place and function. One type of equipment employed therein is called "LAMPS" or light airborne multi-purpose systems. These are designed for a variety of operations including anti-submarine warfare, the surveillance of ships, for search and rescue operations, medical evacuations and for many other purposes.

In the use of helicopters for such military purposes, and also in the maintainance and operation of civilian aircraft of that type as well, frequently it is necessary or desirable or both to fold the rotor blades back in a side by side parallel position: so as to reduce their collective bulk before or after operational use of such aircraft. Different types of apparatus and assemblies have heretofore been proposed for the purpose of maintaining such rotor blades in folded relation. For the most part, however, these prior art devices are hydraulically or electrically actuated and are subject to frequent "down" time for repair and maintenance. Furthermore, they are often quite heavy and bulky, which are obvious disadvantages in helicopter operation and maintenance, where weight must be kept to a minimum both in the air and on the ground. Furthermore, normally helicopter blades are relatively light and for that reason do not ordinarily require electrically or hydraulically actuating mechanisms in order to retain folded rotor blades in that position.

U.S. Pat. No. 3,133,715 discloses one example of a hand operated apparatus in the nature of a so-called "clip" for supporting and holding foldable rotor blades on helicopters. But hand operated equipment is not without its disadvantages: such as premature closings of the clip before proper engagement of the rotor blade within the bifurcated arms of the clip. In addition to such problems it has also been found that under certain conditions—high velocity winds for example, the rotor blade will have a tendency to slip bodily in a direction away from and out of the embrace of the holding arms of the clip.

Damage to the rotor blades and even to the aircraft on which they are mounted can result from high velocity winds or other airborne disturbances when the rotor blades are in the straight out unfolded position as well as when they are folded back to reduce bulk or for other purposes. The present improved clamp is applicable to both the folded and the unfolded rotor blades.

The present invention therefore contemplates means in the nature of an improved manually operable clamping device for helicopter rotor blades or the like which, as a practical matter, eliminates the problems of premature clamping action and rotor blade slippage, for both the folded back and the straight out unfolded blades.

DESCRIPTION OF DRAWINGS

With the above and other objects in view, as will be apparent, the invention consists in the arrangement and combination of parts hereinafter described and illustrated in the accompanying drawings wherein.

DETAILED DESCRIPTION

Figure 1:
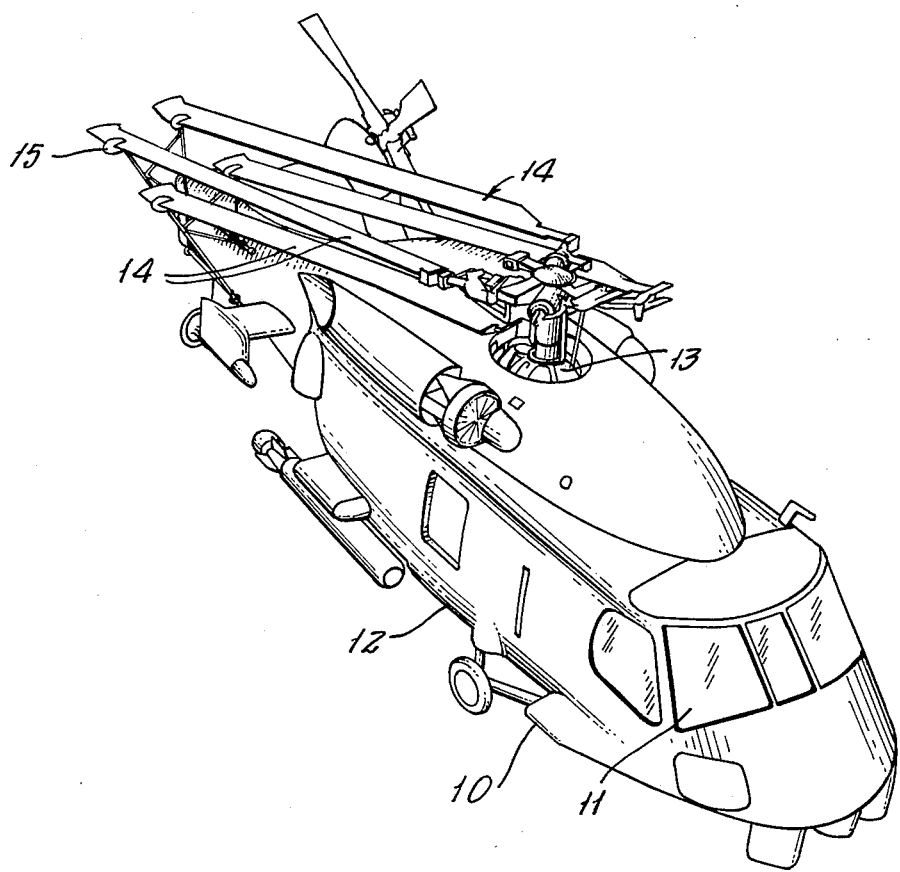
FIG. 1 is a perspective view of a light airborne multipurpose system military helicopter aircraft ("LAMPS"), with its four rotor blades in folded configuration for stowage onboard ship on the aft fuselage. As will be apparent therefrom, each of the blades of the rotor is clampingly engaged and releasably held in the folded position shown as by means of the present improved aircraft structure in the nature of a rotor blade clamping means.

In a preferred embodiment of the present invention the improved rotor blade clamp may be used to releasably secure and clampingly engage one or more of such blades on the aft section or elsewhere on a military or civilian helicopter 10 or the like comprising a cabin 11, fuselage 12, and engine 13 upon which the several rotor blades 14 are mounted in spaced relation. The construction of the blades 14 is such that in their inoperative position they may be left straight out or folded back so as to reduce the bulk of the aircraft 10 while it is on the ground and not in flight. In the arrangement illustrated in FIG. 1, the rotor blades 14 are folded back in generally parallel relationship with each other and somewhat obliquely with respect to the longitudinal direction or dimension of the helicopter fuselage 12.

The present rotor blade clamping device 15 can be seen in FIG. 1 in the operative position and as located near the end portion of the leading edge of each of the four blades 14 of the ship 10.

The particulars of construction of the blade clamping member 15, as set forth herein, are to be considered and understood as common to all of the blade clamps 15. That is to say that although each clamping device 15 is independent of the others, they all operate in substantially the same way and collectively cooperate and function so as to secure all of the rotor blades 14 at the same time in a retracted position for example, such as that seen in FIG. 1: thereby effectively reducing the whole bulk of the grounded aircraft 10. However, these clamps 15 may also be employed to protect the rotor blades 14 when they are in the extended or full length operative position and the aircraft 10 is stationary on the ground.

Figure 2:
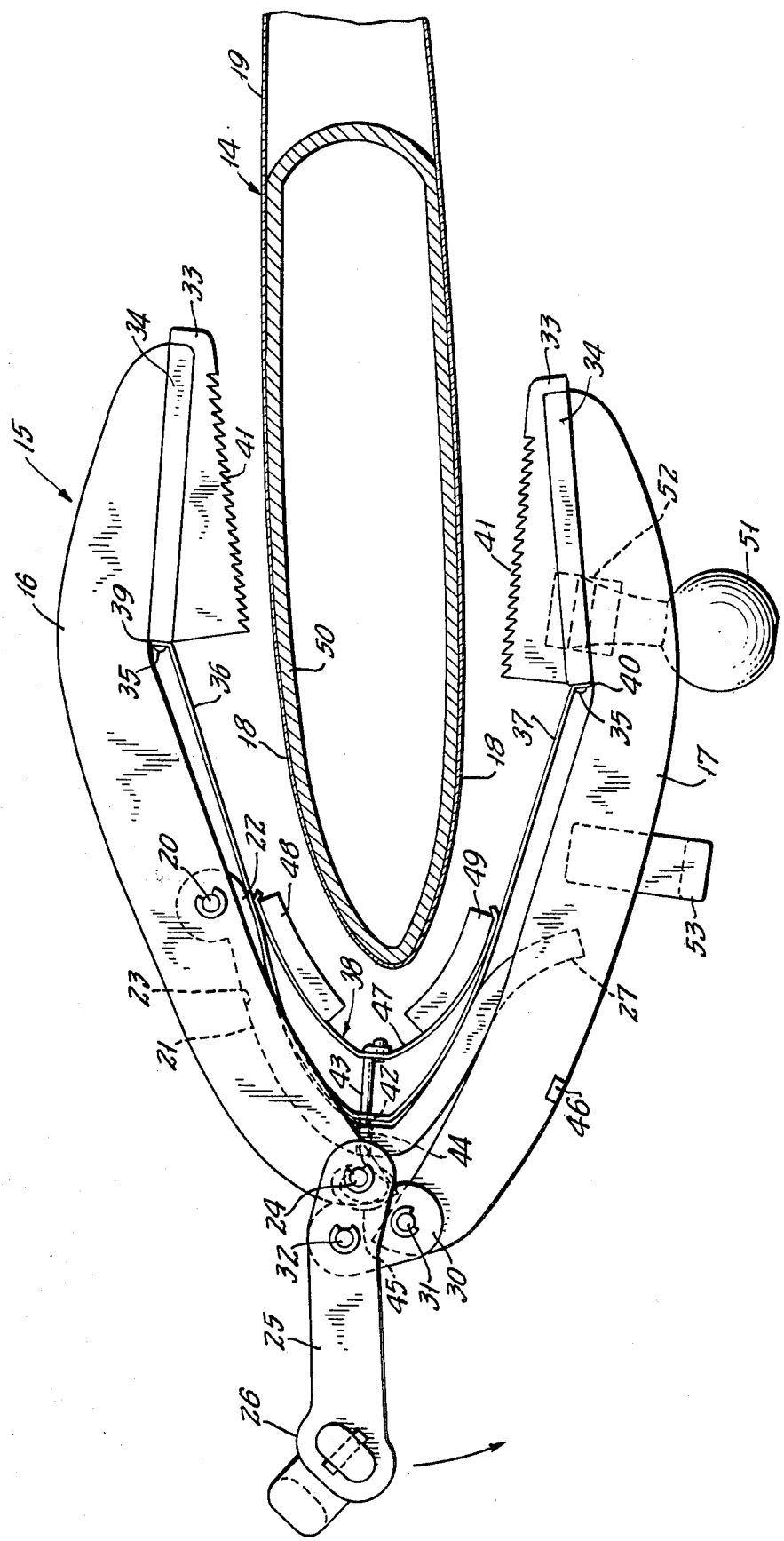
FIG. 2 is a view from one side of the improved clamp, in the open and inoperative position with a terminal portion of one of the rotor blades (in section) within but free of actual clamping engagement by, the jaws of the clamp.

Referring now to FIG. 2, in a preferred embodiment, the present rotor blade clamping device 15 may comprise a movable upper jaw 16 constructed and arranged to cooperate with a stationary or immovable lower jaw member 17: both of the jaws 16, 17 being contoured so as to clampingly engage only the leading end portions 18 of the rotor blade 14, while avoiding contact with the soft damage-prone trailing end surfaces 19 of the blade 14. Both of the jaws 16 and 17 may be made of aluminum or other metal.

The upper jaw 16 is connected as by means of the pin 20, about which it pivots, to the main structural brace 21, which also may be made of aluminum and which as seen in FIG. 2 is formed in the shape of a yoke with two arms. The upper arm 22 of the yoke 21 terminates at the pivot point pin 20 and is bodily interposed within a recessed portion 23 of the upper jaw 16. The inner or other end of the upper jaw 16 is directly connected by means of the pin 24 to a lever arm 25, the outer end 26 of which extends away from both of the jaws 16, 17 when the jaws are in the open position. When the lever arm 25 is pulled downward the upper jaw 16 pivots about pin 20 to move bodily in the direction of the cooperating lower jaw 17 and to clampingly engage therebetween the leading end portion 18 of the rotor blade 14.

The lower jaw 17 which as stated above does not move in the clamping operation may also be made of aluminum or other metal with similar properties. Its size and shape, generally speaking, will match those of the upper jaw 16. However, preferably the lower jaw 17 is welded or otherwise made integral with or securely fixed to the bottom arm 27 of the main structural brace 21 as a solid integrated assembly. This fixed disposition of the lower jaw 17 is therefore in contrast to the relation between the upper jaw 16 and the upper arm 22 of the brace 21, about which the upper jaw 16 pivots as at pin 20.

It will also be seen that while the upper jaw 16 is directly connected to the lever arm 25 by means of the pin 24, the lower jaw 17 is attached to the same lever arm 25 only indirectly: that is, by means of an oval shaped short link 30, one end of which is joined to the lower jaw 17 by means of the pin 31. The other end of link 30 is connected to the lever arm 25 by means of another pin 32 which is interposed on the lever arm 25 at a point intermediate the free end 26 of the lever arm 25 and the pin 24 at the other end of arm 25 which directly attaches the upper jaw 16 to the inner end of the lever 25.

With the arrangement just described of the two cooperating jaws 16 and 17 linked to the lever arm 25 a tractive or pulling force exerted on the lever arm 25 in the direction indicated by the arrow in FIG. 2 will impart an initial clamping action by causing the upper jaw 16 to pivot about the pin 20, and to apply a downward pressure against the top surface of the leading end portion 18 of a rotor blade 14 when such blade is interposed within the jaws 16 and 17 of the present clamp assembly 15.

Figure 3:
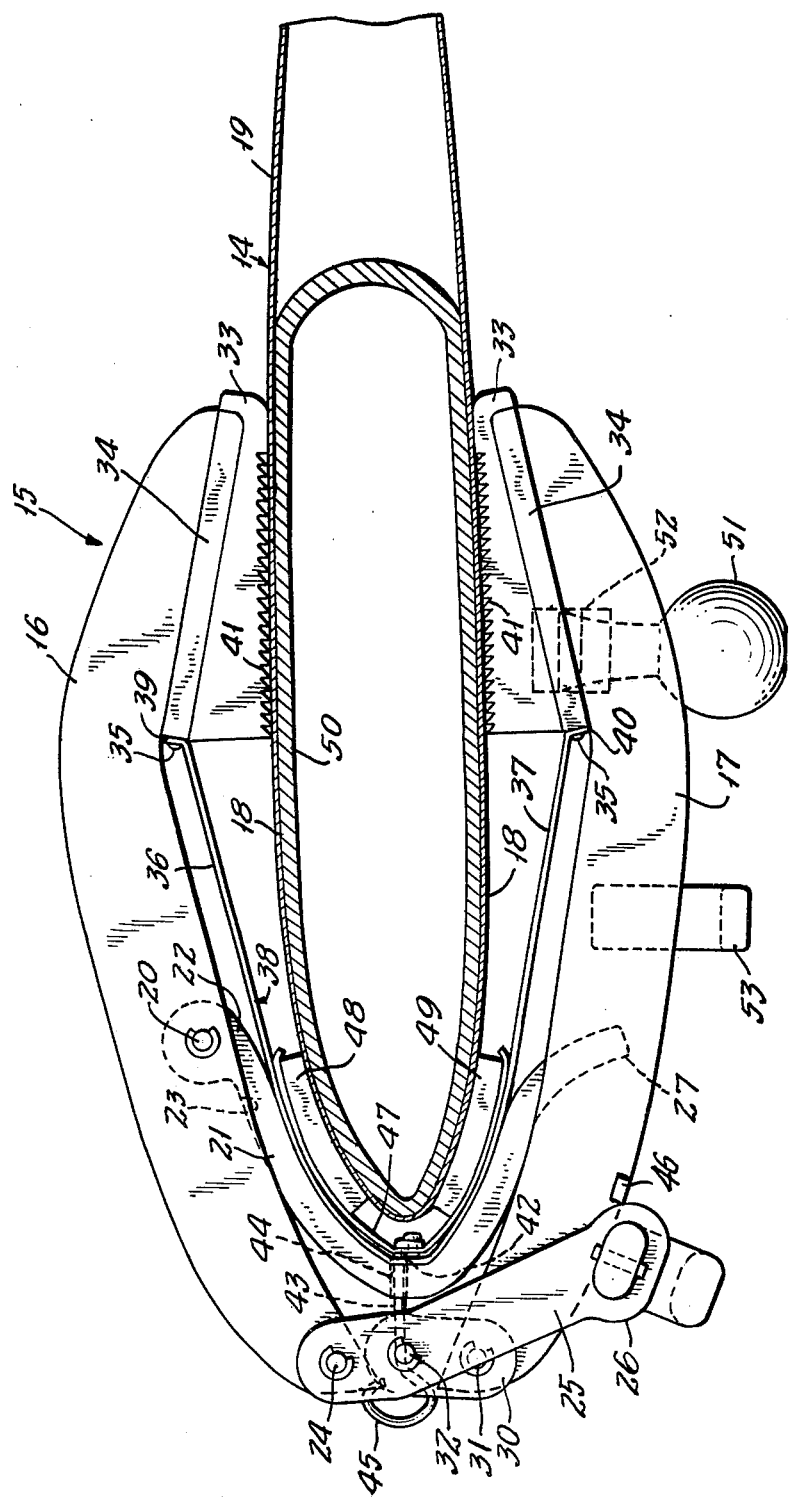
FIG. 3 is a view similar to that of FIG. 2, except that in this case the leading end of the rotor blade is resting snugly against the inside walls of the present device; with its top and bottom surfaces clampingly engaged fore and aft by the upper and lower jaws, respectively of the apparatus, and comprising also a pair of co-acting movable inside jaws constructed and arranged to increase the clamping pressure on the blade during a slippage condition.

Furthermore, a locking action of the lever arm 25 is obtained, as seen in FIG. 3, which is the closed or engaged position of the clamp 15, when the pin 32 at the upper end of the link 30 passes to the right of the center line of the pin 31 on the lower end of the link 30 and pin 24, which directly connects the upper jaw 16 to the lever arm 25.

The clamping pressure of the two jaws 16 and 17 cooperating in the closed position as in FIG. 3 may be compounded or increased by means of the bodily moveable or slideable rubber wedges 33, which may alternatively be made of neoprene or other soft composition. These wedges 33 are mounted interiorly of the jaws 16, 17 at the respective end portions of each jaw. This supplementary pressure applied to the areas of the leading end portion 18 of the rotor blade 14 but not in the damage-prone area of the trailing end portion 19 thereof, comes into being and takes effect when and if a force in a direction away from the mouth of the clamp 15 is occasioned: for example by a strong wind. Because of the susceptibility of rotor blades to high velocity winds, it has been found that the present rotor blade clamp assembly 15 may be employed not only when the blade 14 is folded back and put into position alongside the fuselage of the aircraft when the ship is inoperative, but also when the rotor blades are fully extended and in the ready or operable position.

The wedges 33 may be made of rubber as stated or neoprene or similar compressable material. They are constructed and arranged to move in unison in a direction away from the mouth of the clamp 15 by means of a base 34 common to each, the inner end of which is attached by conventional fastening means 35 to the opposed terminal arms 36 and 37 of a thin metal flexible sheet 38 which may be made of aluminum or sheet steel, or other composition which has a spring-like characteristic or tendency when bent such as to regain its original flat contour and shape.

As noted in both FIG. 2 and FIG. 3 hereof, the spring like sheet 38 is bent into a V shape with its outer ends 39, 40 attached to the bases 34 of the rubber wedges 33. These wedges 33 as shown may be serrated as at 41 at their opposing innerfaces. The inner or medial portion of the bent metal sheet 38 is perforated as at 42 to receive one end of an elongated fastener member 43 which controls the position of the sheet 38 relative to the jaws 16 and 17 of the clamp 15. The body portion of the fastener 43 extends through an aperture 44 of the main brace 21 in registration with the opening 42 in the sheet member 38. The other end of the fastener 43 that is distant from the metal sheet 38 is shaped in the form of a hook 45. That hook 45 operates to avoid false engagement of the jaws 16, 17 and the locking thereof until the rotor blade 14 is enclosed inside the mouth of the jaws 16, 17 and pushes the body of the fastener 43 in a direction away from the open ends of the jaws 16, 17, and far enough in that direction to release the keeper-hook 45 from its engagement with the underside of the pin 24 in respect of which the hook 45 functions as a releasable keeper. It will be understood of course that the both the upper and lower jaws 16 and 17 are recessed to provide a passageway for the hook 45 of the fastener 43, to receive the main brace yoke 21, and apertured to accommodate the pivot pins 20, 24; whilst the lever arm 25 and link 30 are similarly apertured to receive the pins 31 and 32. A stop 46 may be added intermediate the lower jaw 17 to limit rotary movement of the lever arm 25 about its pivot point 24.

An innermost metallic yoke 47 padded on both sides as at 48, 49 is also loosely attached to the forward end of the fastener member 43 and is free for limited movement traversing the length of the fastener 43 responsive to introduction of the rotor blade 14 within its generally V shaped contour and against the protective pads 48, 49 which thereupon come in contact with the top and bottom contours of the leading end surfaces 18 of rotor blade 14. As is generally known, this leading end portion 18 of the blade 14 is interiorly reinforced as by a spar or aluminum tubing 50 which imparts a greater strength to its structure than is found in the trailing end areas 19 of the blade 14, the latter characteristically having an almost frangible honeycomb-like interior supporting structure. It is for that reason particularly, as well as others, that the present clamp in contrast to prior art clamping devices, does not come into contact with the trailing end portions 19 of the rotor blade 14 when the blade 14 is clampingly engaged within the jaws 16, 17.

As already noted the blade clamp 15 normally is urged in the opening sense or position by the spring like V shaped bent thin metal sheet 38. Moreover a false engagement of the jaws 16, 17 is prevented by the hook 45 on the end of the fastener 43 which functions as a keeper so as to prevent the lever arm 25 from reaching its locking position against the stop 46 on the underside of the lower jaw 17, until the rotor blade 14 is inserted and pushes the fastener 43 horizontally and far enough to release the pin 24 from keeper member 45. Being thus released, the pin 24 moves obliquely and vertically upwardly and to the left, away from the keeper 45 as the lever 25 is pulled downward. At the same time the link 30 rotates about its lower pivot point 31 until its upper pivot point 32 passes to the other side or to the right of the center line of the co-acting pins 24 and 31 as seen in FIG. 3. This simultaneous movement of the pin 24 up and obliquely to the left, and of the link pin 32 to the right continues until the end of the lever arm 25 bears or rests against the stop 46 positioned on the lower jaw 17. The lever 25 is then locked into position and the rotor blade 14 is clampingly engaged between the jaws 16, 17 of the present rotor clamping device 15.

Optional clamp attachment features may include a steel ball 51 which of course may be made of other metallic material, bolted or otherwise affixed as at 52 to the underside of the lower jaw member 17 for attachment to a conventional pole assembly (not shown) located aft of the fuselage. This type of attachment will be suitable when the rotor blades 14 are in the folded position as illustrated in FIG. 1 herein. When the blades are in the open, operative or full length position, a tie-down bar 53 may be utilized for a conventional rope or web tie-down (not shown) to the stationary aircraft. This will protect the blades and the ship from damage due to high velocity winds or other airborne disturbances, if its rotor blades are locked in the embrace of the present clamps.

Thus the clamp 15 of the present invention functions to clamp the blade skin covering the near parallel surfaces of the structural spar (the inner tubing reinforcement of the leading end portion of the helicopter rotor blade, referred to above) while simultaneously avoiding contact with the damage-prone trailing end surface portions of the rotor blade.

What is claimed is:

1. A clamping device for helicopter rotor blades or the like comprising clamping means for clampingly engaging only the leading end portion of the rotor blade while maintaining the trailing end portion thereof out of contact with said device, said clamping means comprising a pair of cooperating upper and lower jaws, lever arm means attached to said jaws for moving the upper jaw downwardly toward the lower jaw, linkage means for connecting said lever arm means directly to the upper jaw and indirectly to the lower jaw, locking means communicating with said linkage means to lock said jaws only in the closed position, means adjacent said linkage means for receiving and clamping said blade within said jaws, and independent means distant from said linkage means for applying supplementary clamping pressure to said blade forward of the trailing end portion thereof.

2. A device according to claim 1 wherein said independent means comprise wedge means slidable on said jaw members for applying pressure to said rotor blade forward of the trailing end portion when a force away from said clamping means is applied to the blade.

3. A device according to claim 1 further characterized in that said clamping means include means for maintaining said locking means inoperative until the leading end portion of said rotor blade is moved into position to be clamped thereby.

4. A device according to claim 3 wherein said means for maintaining the locking means inoperative include a compressible resilient metal sheeting formed into a yoke disposed between said jaws for receiving and engaging said leading end portion of said rotor blade, and constructed and arranged to urge said claming means in the opening sense, said yoke being movable toward and away from said linkage means, and a hook member releasably engageable with said locking means to prevent movement of said upper jaw downwardly toward the lower jaw, when said blade member does not engage said yoke, said hook member being fixed to said yoke for movement therewith.

5. A clamping device for helicopter rotor blades or the like wherein the rotor blades have a leading end portion with a reinforcing spar and a blade profile with opposing surface portions, said clamping device comprising clamping means of predetermined size for clampingly engaging opposing surface portions of the rotor blade at the spar while avoiding gripping contact with the surface portions of the rotor blade that are away from the spar, said clamping means including a pair of cooperating opposing jaw members respectively corresponding to the opposing surface portions of said rotor blade, at least one of said jaw members being movable from a predetermined release limit position with respect to the other jaw member wherein said clamping means do not grip the opposing surfaces of said rotor blade, to a predetermined engagement limit position with respect to the other jaw member wherein said clamping means grip the opposing surfaces of said rotor blade at said spar with a predetermined amount of force, and a lever member connected to said one of said jaw members for moving said one jaw member from said release limit position to said engagement limit position and vice-versa to provide a quick engagement and a quick release of said clamping means with respect to said rotor blade.

6. A clamping device as claimed in claim 5 wherein said jaw members define a mouth portion for receiving said rotor blade, said mouth portion being relatively open when said one jaw member is in said release limit position, and said mouth portion being relatively closed when said one jaw member is in said engagement limit position, said clamping means further including joining means for joining said one jaw member to said other jaw member, to permit said one jaw member to pivot with respect to said other jaw member in cooperation with said lever member to place said mouth portion in said limit positions.

7. A clamping device as claimed in claim 6 wherein said joining means comprise a bifurcated rigid member having one arm portion pivotally connected to said one jaw member at a pivot joint and another arm portion immovably secured to the other jaw member.

8. A clamping device as claimed in claim 6, wherein said lever member is pivotally connected to said one jaw member by first pivot means at a predetermined distance from said pivot joint, said clamping means further including a link member pivotally connected to said other jaw member by second pivot means and pivotally connected to said lever member by third pivot means, the relative locations of said first, second and third pivot means being selected such that movement of said lever member in a first direction when said one jaw member is in said release limit position causes said one jaw member to move toward said engagement limit position, and movement of said lever member in the opposite direction when said one jaw member is in said engagement limit position causes said one jaw member to move toward said release limit position.

9. A clamping device as claimed in claim 8, wherein said first pivot means is at one end portion of said lever member and another end portion of said lever member is remote from said first pivot means, said third pivot means being between said first pivot means and said other end portion of said lever member.

10. A clamping device as claimed in claim 9, wherein said third pivot means is spaced from a line joining the first and second pivot means when said one jaw member is in said release limit position, said third pivot means being shiftable toward said line when said lever member is moved in said first direction to move said one jaw member toward said engagement limit position.

11. A clamping device as claimed in claim 10, wherein said third pivot means is at a predetermined position on said lever member such that said third pivot means is moved past the line joining the first and second pivot means when said one jaw member is in said engagement limit position, the movement of said third pivot means in said first direction past said line joining the first and second pivot means serving to detent or lock said one jaw member in said engagement limit position.

12. A clamping device as claimed in claim 11, wherein interference means for stopping movement of said lever member in said first direction are provided on said other jaw member and said lever member to permit interfering engagement between said lever member and said other jaw member when said one jaw member is in said engagement limit position, said interfering engagement occurring after said third pivot means is moved past the line joining said first and second pivot means.

13. A clamping device as claimed in claim 5 wherein said clamping means further include means actuatable by said rotor blade member when said rotor blade member is disposed between said jaw members for permitting said one jaw member to move from said release limit position to said engagement limit position, said actuating means including means for preventing said one jaw member from moving to said engagement limit position when said rotor blade is not disposed between said jaw members.

14. A clamping device as claimed in claim 10 wherein said clamping means further include means actuatable by said rotor blade member when said rotor blade member is disposed between said jaw members for permitting said one jaw member to move from said release limit position to said engagement limit position, said actuating means including means for preventing said one jaw member from moving to said engagement limit position when said rotor blade is not disposed between said jaw members.

15. A clamping device as claimed in claim 14 wherein said actuating means include a latch member movably disposed between said jaw members for movement toward and away from the mouth portion of said jaw members, said latch member including an engaging portion engageable with one of said first and third pivot means when said one jaw member is in said release limit position to prevent movement of said lever member in said first direction and thereby prevent said one jaw member from being moved into said engagement limit position.

16. A clamping device as claimed in claim 15 wherein said latch engaging portion is engageable with said first pivot means.

17. A clamping device as claimed in claim 15 wherein said clamping means include biasing means on said jaw members for urging said jaw members to said release limit position, said biasing means being movable on said jaw members toward and away from said mouth portion and arranged such that disposition of said blade member in said clamping means for gripping by said jaw members causes said biasing means to move away from said mouth portion.

18. A clamping device as claimed in claim 17 wherein said latch member is affixed to said biasing means such that said blade member, when disposed in said clamping means for gripping by said jaw members moves said biasing means away from said mouth portion and also moves the engaging portion of said latch member out of engagement with said first pivot means thereby permitting movement of said lever member in said first direction to cause movement of said one jaw member toward said engagement limit position.

19. A clamping device as claimed in claim 18 wherein said biasing means comprise a bifurcated flexible spring member having one arm arranged to exert a force against said one jaw member and another arm arranged to exert a force against said other jaw member.

20. A clamping device as claimed in claim 5 wherein said clamping means further include at least one compressible pressure member associated with each of said jaw members for engagement with said rotor blade to provide a slip proof grip by said jaw members on said rotor blade when said one jaw member is in said engagement limit position.

21. A clamping device as claimed in claim 20 wherein said pressure members are in the shape of a wedge and have a contact surface engageable with respective opposing surface portions of said rotor blade at said spar.

22. A clamping device as claimed in claim 21 wherein said contact surface is serrated.

23. A clamping device as claimed in claim 21 wherein said compressible wedge members are movably mounted on said jaw members for slidable movement with respect to the respective jaw members and arranged increase the gripping force of said clamping means on said blade member upon movement of said blade member outwardly of said jaw members when said clamping means is in said engagement limit position.

24. A clamping device as claimed in claim 5 wherein said clamping means include means for detenting said one jaw member in said engagement limit position.

25. A clamping device as claimed in claim 24 wherein said clamping means further include means for maintaining said detent means inoperative until the leading end portion of said rotor blade is moved into position between said jaw members to be clamped by said clamping means.

26. A clamping device as claimed in claim 5 wherein said clamping means includes biasing means on said jaw members for urging said one jaw member into said release limit position.

27. A clamping device as claimed in claim 26 wherein said jaw members define a mouth portion for receiving said rotor blade, said mouth portion being relatively open when said one jaw member is in said release limit position, and said mouth portion being relatively closed when said one jaw member is in said engagement limit position, said biasing means being movably disposed between said jaw members for movement toward and away from said mouth portion.

28. A clamping device as claimed in claim 27 wherein said biasing means comprise a bifurcated flexible spring member having one arm arranged to exert a force against said one jaw member and another arm arranged to exert a force against said other jaw member.

29. A clamping device as claimed in claim 5 wherein interference means for stopping movement of said lever member in said first direction are provided on said other jaw member and said lever member to permit interfering engagement between said lever member and said other jaw member when said one jaw member is in said engagement limit position.

* * * * *